March 1, 1927. 1,619,094
A. C. THOMAS
TRACTOR DUMP WAGON
Filed Nov. 28, 1925 2 Sheets-Sheet 1

Inventor
A.C.Thomas.
By Arthur H. Sturges,
Attorney

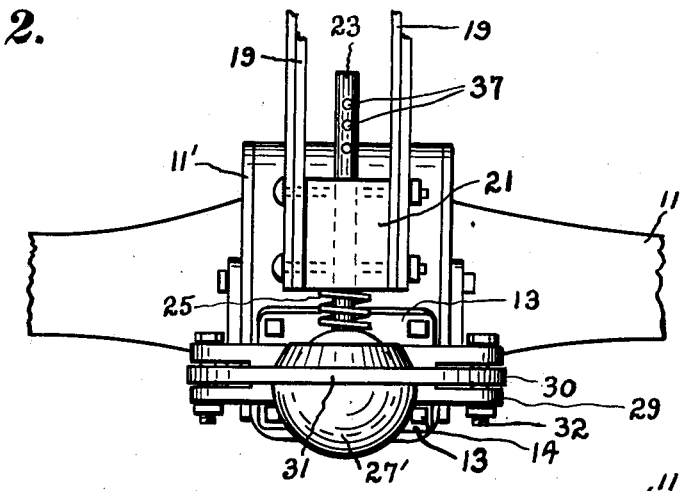
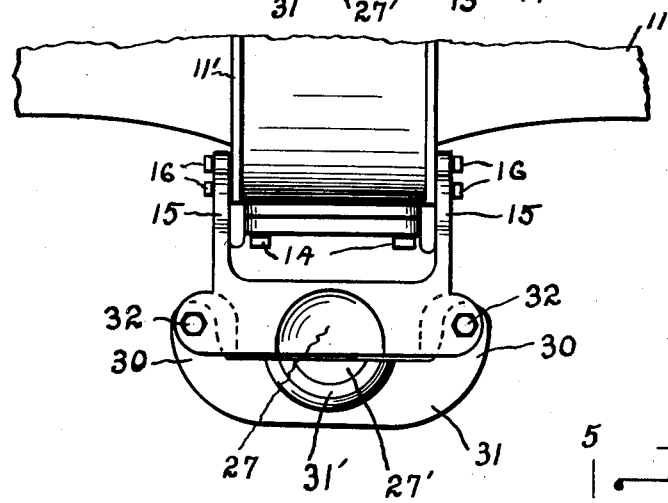
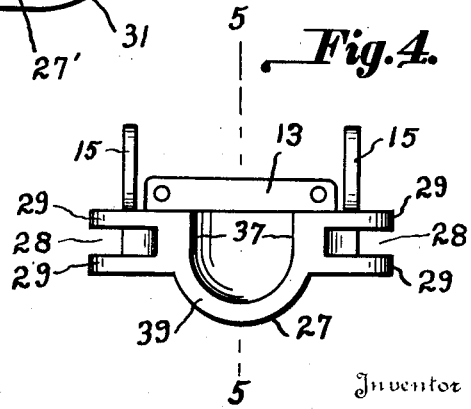
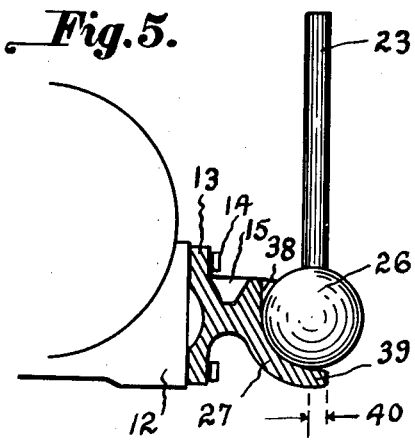

Patented Mar. 1, 1927.

1,619,094

UNITED STATES PATENT OFFICE.

ARTHUR C. THOMAS, OF OMAHA, NEBRASKA, ASSIGNOR TO THE LITTLE RED WAGON MFG. CO., A FIRM COMPOSED OF A. C. SCOTT, W. R. McFARLAND, W. H. JONES, A. J. COOLEY, AND C. MACKEY, OF OMAHA, NEBRASKA.

TRACTOR DUMP WAGON.

Application filed November 28, 1925. Serial No. 71,899.

The present invention relates to improvements in tractor dump wagons and has for an object to provide an improved dump wagon in combination with a tractor, whereby the tractor may be used to haul a number of wagons, one at a time.

Another object of the invention is to provide an improved coupling between the tractor and the wagon, which will admit of quick detachment, whereby a single tractor may draw a number of the wagons one at a time.

A further object of the invention lies in providing an improved swivel ball and socket connection between the tractor and wagon and in so further constructing the wagon that an extremely short turn may be negotiated.

A still further object of the invention is to provide a tractor and wagon unit in which the necessity for front wheels and steering connections in the wagon is dispensed with, utilizing the tractor therefor. The elimination of these parts reduces the cost of the wagon.

It is a still further object of the invention to provide a simply constructed, strong coupling which will not only unite the wagon and structure but serve to support the front of the wagon, while providing for the ready release of the tractor.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of a dump wagon, parts being broken away, attached to the rear of a tractor by means of a ball and socket connection with parts of same in section.

Figure 2 is a rear view of a part of the tractor's rear axle and showing the new connecting means applied thereto.

Figure 3 is a top plan view of the same the ball and its adjunct parts being removed.

Figure 4 is a rear elevation of one of the connection members, and

Figure 5 is a sectional view of the member shown in Figure 4, the view being taken along the line 5—5, but with said member attached to a fragment of the tractor's axle, and a ball seated on said member.

Figure 1:
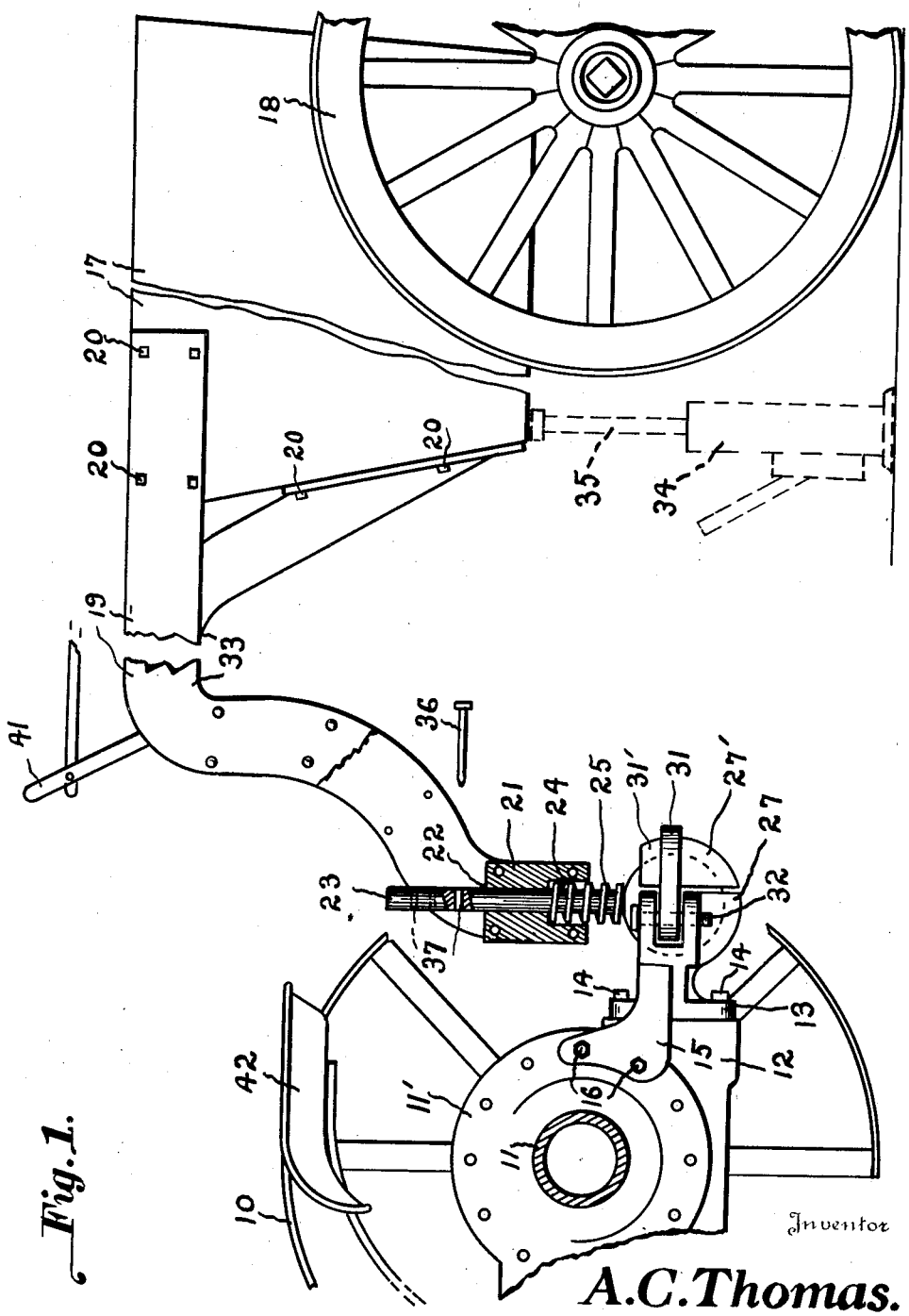

Referring now to the drawing for a more particular description the numeral 10 indicates a tractor of conventional type such as a Fordson, having a rear axle housing 11, a ring gear housing 11' and a worm screw housing 12.

The Fordson tractor is provided with a cover plate for the worm screw housing, said plate being provided with a projecting flange adapted to function as a coupling between the tractor and various tools or vehicles to be drawn.

But since said cover plate is too weak in construction, in the practice of the present invention it is removed and the cover plate 13 substituted therefor and secured by means of bolts 14 and 16.

The member 13 is provided with arms 15, best shown in Figure 4, which are adapted to span the ring gear housing 11' and fit snugly against its side walls as best shown in Figure 3. The arms 15 are secured by means of stud bolts 16 which operate in conjunction with the bolts 14 to provide a very rigid mounting for the member 13. The body of the dump wagon indicated at 17 is provided with a pair of rear wheels 18. Front wheels are omitted and in lieu thereof a goose-neck shaped draw bar 19 is substituted, its forward end resting upon and attached to the member 13 by means later described.

The draw bar is preferably formed of four pieces when forgings are used, said pieces being attached by bolts 20 to the wagon body. However formed, the forward lower end of the draw bar is provided with a bearing block 21 having a vertical aperture 22 adapted to receive a shaft 23 and a recess 24 adapted to receive a spring 25, said spring being placed around said shaft for purposes later described.

As best shown in Figure 5 the shaft 23 is integral with a ball 26 adapted to rest upon a socket member 27, said socket member 27 being integral with the casting or member 13.

The member 13 is further provided with opposed recesses 28 (Figure 4) formed between the projecting portions 29 of the casting. The recesses 28 are adapted to receive the tongues 30 of a collar 31, which as clearly shown in Figure 3 is secured by means of pins or bolts 32 placed through apertures of the projections 29 and tongues 30. The collar 31 is formed with a socket member 27' which when locked together with the member 27, as shown in Figure 3, forms a receptacle for receiving the ball 26.

In practice such as road building and grading operations, requiring short turning of the vehicles, over rough, uneven ground, it will be noted that the tractor 10 may be turned at more than a right angle to the position of the wagon, on account of the arch 33 of the draw bar 19 which will permit the rear wheels of the tractor to move underneath it, the shaft 23 of the ball 26 functioning as a king-bolt during such turning movements.

When traveling over uneven ground and at times when the front and rear wheels of the tractor are not in horizontal alinement nor in horizontal alinement with the wheels of the wagon the ball 26 may turn in any direction since it is fitted into its socket somewhat loosely, the result being that swinging movements of the shaft 23 are permitted and compensation for the non-alinement of the wheels is thus provided, while at the same time draft is secured without undue friction.

Since the major portion of the weight of the wagon is forward of its axle and when loaded an appreciable weight is placed upon the block 21, said weight would cause a pounding motion upon the ball and undue wear between the block and ball, while the vehicles travel over rough and bumpy ground, but by the provision of the spring 25 between the block and ball a cushioning effect is secured, and crystallization and breakage of these metal parts prevented.

It will be understood that at times it is advantageous to disconnect the vehicles, when the tractor is to be used for other purposes. Furthermore, in some classes of hauling such as ash removing it is desirable to leave the wagon in one location for lengthy periods of time, while the tractor is doing other work, and in a still further class of hauling it is economical to have one tractor serve a plurality of wagons, thus necessitating an easy means of disconnecting the tractor from a wagon. Such disconnection is accomplished as follows:—

When it is desired to disconnect the wagon, it is usually supported at its forward end by means of a conventional jack, shown in dotted lines in Figure 1 and indicated by the numeral 34, said jack shaft 35 being caused to move upward a sufficient distance to relieve the weight from off of the ball 26. One of the pins 32 is next withdrawn and the collar 31 swung to one side. A large nail or similar article 36 is now placed within a selected aperture 37 of the shaft 23 for the purpose of preventing the shaft from sliding completely through the block 21 when the tractor is moved forward. A forward movement of the tractor will complete the operation.

In connecting the tractor to the wagon the particular shape of the specific socket illustrated has been found of great advantage.

Referring to Figures 4 and 5 particularly it will be noted that the side walls 37 of the socket member 27 are vertically parallel and as clearly shown in Figure 5 the rear wall 38 is likewise vertical and this is of advantage since the substantially semi-cupped shaped member 27 thus formed is open at its top and will thus facilitate the reception of the ball when the jack's shaft 35 is lowered by the operator.

In Figure 5 it will be noted that the rear edge or face of the member 27 indicated at 39 is slightly beyond the medial line of the ball, the distance being indicated between the arrow heads 40, thus providing a shelf upon which the ball may rest when the pin 36 is withdrawn by the operator.

After the ball is in place as shown in Figure 5 the collar 31 is next secured as shown in Figure 2, and the jack 34 removed.

As shown in Figures 1 and 3 the collar 31 is provided with an upstanding flange 31' which overlaps the horizontal medial line of the ball and thus prevents the removal upward of the ball from the socket at all times unless the collar is first removed.

The wagon body 17 is provided with a normally closed hinged bottom adapted to be released for dumping the contents by a movement of the lever 41 and other mechanism not shown. The operator during the dumping operation is positioned in his seat 42 for a control of the tractor and as thus situated may easily grasp the lever 41. As thus described one man may operate the tractor and dump wagon.

I do not wish to be restricted to the size, form, and proportions of the various parts, and obviously changes could be made in the construction herein described without departing from the spirit of the invention, it being only necessary that such changes fall within the scope of the appended claims:—

What is claimed is:—

1. In combination, a tractor, a wagon, a beam on the wagon, a shaft slidably carried by the beam, a universal ball carried by said shaft, resilient means interposed between said ball and beam and positioned to yieldably sustain the load and a universal socket on the tractor for receiving said ball.

2. In combination, a tractor, a wagon, a beam on the wagon, a perforated shaft slidably carried by said beam, means to enter the perforations of said shaft to avoid the detachment of the shaft from the beam, a universal ball carried by said shaft, resilient means interposed between said ball and beam, and a socket for the ball carried by said tractor.

3. In combination with a tractor having a ring gear housing and a worm screw housing, a cover plate for the worm screw housing having a partial socket member carried thereby, arms on said member for embracing said ring gear housing and secured thereto, a second socket member carried removably by said first mentioned member, a wagon, and a universal ball carried by said wagon for fitting within the socket formed by said members.

4. A universal coupling comprising a ball member, and a socket member composed of a seating member having substantially vertically parallel side and rear walls and with a lower seating edge projecting beyond the vertical median line of the ball, and a second confining member detachably secured to said first member and having a portion extending above the horizontal median line of said ball.

ARTHUR C. THOMAS.